United States Patent
Wang

(10) Patent No.: US 10,619,223 B2
(45) Date of Patent: *Apr. 14, 2020

(54) ZINC-COATED HOT FORMED STEEL COMPONENT WITH TAILORED PROPERTY

(71) Applicant: GM Global Technology Operations LLC, Detroit, MI (US)

(72) Inventor: Jianfeng Wang, Novi, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 997 days.

This patent is subject to a terminal disclaimer.

(21) Appl. No.: 15/141,248

(22) Filed: Apr. 28, 2016

(65) Prior Publication Data

US 2017/0314088 A1    Nov. 2, 2017

(51) Int. Cl.

| | | |
|---|---|---|
| C21D 9/06 | (2006.01) | |
| C21D 9/00 | (2006.01) | |
| B32B 15/01 | (2006.01) | |
| C21D 1/06 | (2006.01) | |
| C21D 1/56 | (2006.01) | |
| C21D 1/60 | (2006.01) | |
| C21D 1/613 | (2006.01) | |
| C21D 1/63 | (2006.01) | |
| C21D 1/667 | (2006.01) | |
| C21D 6/00 | (2006.01) | |
| C21D 6/04 | (2006.01) | |
| C22C 38/00 | (2006.01) | |
| C22C 38/02 | (2006.01) | |
| C22C 38/04 | (2006.01) | |
| C22C 38/06 | (2006.01) | |
| C22C 38/28 | (2006.01) | |
| C22C 38/38 | (2006.01) | |
| C23C 2/06 | (2006.01) | |

(52) U.S. Cl.
CPC .......... *C21D 9/0068* (2013.01); *B32B 15/013* (2013.01); *C21D 1/06* (2013.01); *C21D 1/56* (2013.01); *C21D 1/60* (2013.01); *C21D 1/613* (2013.01); *C21D 1/63* (2013.01); *C21D 1/667* (2013.01); *C21D 6/002* (2013.01); *C21D 6/005* (2013.01); *C21D 6/008* (2013.01); *C21D 6/04* (2013.01); *C22C 38/002* (2013.01); *C22C 38/02* (2013.01); *C22C 38/04* (2013.01); *C22C 38/06* (2013.01); *C22C 38/28* (2013.01); *C22C 38/38* (2013.01); *C23C 2/06* (2013.01); *C21D 2211/001* (2013.01)

(58) Field of Classification Search
CPC .................................................. C21D 9/0068
See application file for complete search history.

(56) References Cited

U.S. PATENT DOCUMENTS

| | | |
|---|---|---|
| 1,828,325 A | 10/1931 | Kurz |
| 2,178,281 A | 10/1939 | Judge |
| 3,111,436 A | 11/1963 | McGavin |
| 3,330,705 A | 7/1967 | Madrzyk et al. |
| 3,340,102 A | 9/1967 | Kulin et al. |
| 3,516,874 A | 6/1970 | Maker et al. |
| 3,907,614 A | 9/1975 | Bramfitt et al. |
| 4,086,104 A | 4/1978 | Kinoshita et al. |
| 4,146,411 A | 3/1979 | Dewsnap et al. |
| 4,327,156 A | 4/1982 | Dillon et al. |
| 4,486,248 A | 12/1984 | Ackert et al. |
| 4,533,401 A | 8/1985 | Yutori et al. |
| 4,744,836 A | 5/1988 | Pfaffmann |
| 5,205,145 A | 4/1993 | Ishino et al. |
| 5,358,578 A | 10/1994 | Tischhauser |
| 5,554,233 A | 9/1996 | Heitmann et al. |
| 5,989,647 A | 11/1999 | Remy et al. |
| 6,270,594 B1 | 8/2001 | Bodnar et al. |
| 6,330,740 B1 | 12/2001 | Krempels |
| 6,364,972 B1 | 4/2002 | Bauer et al. |
| 6,564,604 B2 | 5/2003 | Kefferstein et al. |

(Continued)

FOREIGN PATENT DOCUMENTS

| | | |
|---|---|---|
| CA | 2378934 A1 | 9/2003 |
| CN | 102031456 A | 4/2011 |

(Continued)

OTHER PUBLICATIONS

Diekman, F. "Cold and Cryogenic Treatment of Steel," ASM Handbook, vol. 4A, Steel Heat Treating Fundamentals and Processes, pp. 382-386.

Dr. Taylan Altan; "Hot-stamping boron-alloyed steels for automotive parts—Part I—Press Technology Tech Cell"; http://www.thefabricator.com/article/presstechnology/hot-stamping-boron-alloyed-steels-for-automotive-parts; Feb. 13, 2007; 3 pages.

Dr. Taylan Altan; "Hot-stamping boron-alloyed steels for automotive parts—Part II—Press Technology Tech Cell"; http://www.thefabricator.com/article/presstechnology/hot-stamping-boron-alloyed-steels-for-automotive-parts-part-ii; Jan. 18, 2007; 2 pages.

Dr. Taylan Altan; "Hot-stamping boron-alloyed steels for automotive parts—Part III—Press Technology Tech Cell"; http://www.thefabricator.com/article/presstechnology/hot-stamping-boron-alloyed-steels-for-automotive-parts-part-iii; Feb. 13, 2007; 2 pages.

(Continued)

*Primary Examiner* — Christopher S Kessler
(74) *Attorney, Agent, or Firm* — Harness, Dickey & Pierce, P.L.C.

(57) ABSTRACT

Methods of selectively cooling and quenching surface regions of high-strength transformation induced plasticity (TRIP) steel are provided. The method may comprise selectively cooling at least one region of an exposed surface of a hot-formed press-hardened component comprising a high-strength steel. Prior to selective cooling, the component has a microstructure comprising ≥about 5% by volume retained austenite in a matrix of martensite. The selective cooling is conducted at a temperature of ≤about −40° C. and forms at least one quenched region comprising ≤about 2% by volume austenite. The TRIP steel may be zinc-coated and having a surface coating comprising zinc and substantially free of liquid metal embrittlement (LME). Zinc-coated hot-formed press-hardened components, including automotive components, formed from such methods are also provided.

19 Claims, 4 Drawing Sheets

(56) References Cited

U.S. PATENT DOCUMENTS

| | | |
|---|---|---|
| 7,166,372 B2 | 1/2007 | Bose et al. |
| 7,393,421 B2 | 7/2008 | Yang |
| 7,677,070 B2 | 3/2010 | Kobayashi |
| 7,703,312 B2 | 4/2010 | Walter |
| 7,727,337 B2 | 6/2010 | Sachdev et al. |
| 7,941,907 B2 | 5/2011 | Yang et al. |
| 8,007,923 B2 | 8/2011 | Sakakibara et al. |
| 8,141,230 B2 | 3/2012 | Brodt et al. |
| 8,252,125 B2 | 8/2012 | Giefers et al. |
| 8,671,729 B2 | 3/2014 | Verma et al. |
| 8,778,261 B2 | 7/2014 | Nakamura et al. |
| 8,888,934 B2 | 11/2014 | Bian |
| 8,926,770 B2 | 1/2015 | Kobayashi et al. |
| 8,932,416 B2 | 1/2015 | Nakanishi et al. |
| 8,992,697 B2 | 3/2015 | Matsuda et al. |
| 9,359,663 B2 | 6/2016 | Mizuta et al. |
| 9,475,113 B2 | 10/2016 | Naitou et al. |
| 9,512,499 B2 | 12/2016 | Tomokiyo et al. |
| 9,593,392 B2 | 3/2017 | John et al. |
| 9,598,745 B2 | 3/2017 | Hayashi et al. |
| 9,605,329 B2 | 3/2017 | Nonaka et al. |
| 9,611,518 B2 | 4/2017 | Naitou et al. |
| 9,617,624 B2 | 4/2017 | Tanahashi et al. |
| 9,644,247 B2 | 5/2017 | Matsuda et al. |
| 9,725,782 B2 | 8/2017 | Nonaka et al. |
| 9,835,194 B2 | 12/2017 | Chiba et al. |
| 9,840,751 B2 | 12/2017 | Hayashi et al. |
| 9,850,554 B2 | 12/2017 | Naitou et al. |
| 9,896,736 B2 | 2/2018 | Tomokiyo et al. |
| 9,920,407 B2 | 3/2018 | Nonaka et al. |
| 9,945,013 B2 | 4/2018 | Nonaka et al. |
| 10,029,294 B2 | 7/2018 | Yamano et al. |
| 10,030,280 B2 | 7/2018 | Hayashi et al. |
| 10,072,324 B2 | 9/2018 | Nonaka et al. |
| 10,260,121 B2 | 4/2019 | Lu et al. |
| 10,385,415 B2 | 8/2019 | Wang et al. |
| 2009/0155615 A1 | 6/2009 | Chen et al. |
| 2009/0238715 A1 | 9/2009 | Cho et al. |
| 2010/0028190 A1 | 2/2010 | Wang |
| 2011/0139308 A1 | 6/2011 | Peruzzi et al. |
| 2012/0267012 A1 | 10/2012 | Sohn et al. |
| 2013/0048161 A1 | 2/2013 | Matsuda et al. |
| 2013/0180969 A1 | 7/2013 | Cheng et al. |
| 2013/0186527 A1 | 7/2013 | Bradley |
| 2013/0199679 A1 | 8/2013 | Toji et al. |
| 2014/0020795 A1 | 1/2014 | Schwinghammer et al. |
| 2014/0065007 A1 | 3/2014 | Naitou et al. |
| 2014/0212687 A1 | 7/2014 | Vlot et al. |
| 2014/0261918 A1 | 9/2014 | Jin et al. |
| 2014/0322559 A1 | 10/2014 | Becker et al. |
| 2015/0024237 A1 | 1/2015 | Tanahashi et al. |
| 2015/0082636 A1 | 3/2015 | Gruneklee et al. |
| 2015/0114199 A1 | 4/2015 | Shepard et al. |
| 2015/0225830 A1 | 8/2015 | Nonaka et al. |
| 2016/0145707 A1 | 5/2016 | Feuser et al. |
| 2016/0145731 A1 | 5/2016 | Sachdev et al. |
| 2016/0147573 A1 | 5/2016 | Shayesteh et al. |
| 2016/0215376 A1 | 7/2016 | Luther et al. |
| 2016/0244855 A1 | 8/2016 | Steinebach et al. |
| 2016/0319389 A1 | 11/2016 | Hayashi et al. |
| 2017/0314089 A1 | 11/2017 | Wang |
| 2017/0321294 A1 | 11/2017 | Arlazarov et al. |
| 2017/0342523 A1 | 11/2017 | Wang et al. |
| 2018/0030567 A1 | 2/2018 | Yi et al. |
| 2018/0216205 A1 | 8/2018 | Wang et al. |
| 2018/0223385 A1 | 8/2018 | Lu et al. |
| 2018/0237877 A1 | 8/2018 | Wang et al. |
| 2018/0312954 A1 | 11/2018 | Yasui et al. |
| 2019/0127829 A1 | 5/2019 | Santacreu et al. |

FOREIGN PATENT DOCUMENTS

| | | |
|---|---|---|
| CN | 102284523 A | 12/2011 |
| CN | 102828109 A | 12/2012 |
| CN | 102906291 A | 1/2013 |
| CN | 102912219 A | 2/2013 |
| CN | 103045950 A | 4/2013 |
| CN | 103547687 A | 1/2014 |
| CN | 103620075 A | 3/2014 |
| CN | 103842546 A | 6/2014 |
| CN | 104160050 A | 11/2014 |
| CN | 104195455 A | 12/2014 |
| CN | 104379272 A | 2/2015 |
| CN | 105026597 A | 11/2015 |
| CN | 105483531 A | 4/2016 |
| CN | 105658821 A | 6/2016 |
| CN | 105734413 A | 7/2016 |
| CN | 105886750 A | 8/2016 |
| CN | 106521338 A | 3/2017 |
| CN | 107338345 A | 11/2017 |
| CN | 107338349 A | 11/2017 |
| CN | 107815612 A | 3/2018 |
| CN | 108359781 A | 8/2018 |
| DE | 102009060388 A1 | 6/2011 |
| DE | 102012104734 A1 | 12/2013 |
| DE | 102015119417 A1 | 6/2016 |
| DE | 102017108835 A1 | 11/2017 |
| DE | 102017108837 A1 | 11/2017 |
| DE | 102018101735 A1 | 8/2018 |
| EP | 1930450 B1 | 7/2011 |
| EP | 2524970 A1 | 11/2012 |
| EP | 2866147 B1 | 8/2016 |
| EP | 2719788 B1 | 11/2016 |
| EP | 3473735 A1 | 4/2019 |
| JP | 3084378 A | 4/1991 |
| JP | 2000178640 A | 6/2000 |
| JP | 2003201549 A | 7/2003 |
| JP | 2008207279 A | 9/2008 |
| JP | 2011016149 A | 1/2011 |
| JP | 5015356 B2 | 8/2012 |
| KR | 2011034452 A | 4/2011 |
| SU | 711126 A1 | 2/1980 |
| WO | 2012120020 A1 | 9/2012 |
| WO | WO-2014024831 A1 | 2/2014 |
| WO | WO-2015102051 A1 | 7/2015 |
| WO | 2016079565 A1 | 5/2016 |
| WO | 2016095664 A1 | 6/2016 |
| WO | WO-2016106621 A1 | 7/2016 |
| WO | 2018107446 A1 | 6/2018 |
| WO | 2019085855 A1 | 5/2019 |
| WO | 2019127240 A1 | 7/2019 |

OTHER PUBLICATIONS

H. Karbasian et al.; "A review on hot stamping"; Journal of Materials Processing Technology 210; Jul. 19, 2010; pp. 2103-2118.
Marion Merkiein et al.; "A review on tailored blanks—Production, applications and evaluation"; Journal of Materials Processing Technology 214; Aug. 27, 2013; pp. 151-164.
International Search Report and Written Opinion for PCT Application No. PCT/CN2014/095753 dated Oct. 8, 2015; 8 pages.
Third Office Action for Chinese Patent Application No. 201511036174.4 dated Jul. 2, 2018 with English language machine translation; 26 pages.
First Office Action for German Patent Application No. 1020171088335.0 dated Jul. 24, 2018 and correspondence dated Aug. 8, 2018 from Manitz Finsterwald Patentanwälte PartmbB summarizing contents; 6 pages.
First Office Action for German Patent Application No. 1020171088337.7 dated Jul. 25, 2018 and correspondence from dated Aug. 8, 2018 Manitz Finsterwald Patentanwälte PartmbB summarizing contents; 6 pages.
Thomas Kurz et al.; "Zinc Coated Press-Hardening Steel Challenges and Solutions"; Voestalpine; Apr. 14, 2015; 12 pages.
First Office Action for German Application No. 102015119417.1 dated Feb. 16, 2017; 5 pages.
First Office Action for Chinese Application No. 201511036174.4 dated Feb. 28, 2017; 8 pages.
First Office Action for Chinese Patent Application No. 201810061046.2 dated Mar. 1, 2019 with English language machine translation; 18 pages.

(56) References Cited

OTHER PUBLICATIONS

Dossett et al., "Practical Heat Treating," Second Edition (ASM International, 2006), pp. 7, 269. ISBN 1615031103 (Year: 2006).
"Dip, Barrier, and Chemical Conversion Coating," *Metals Handbook Desk Edition, ASM International,* 1998, p. 1154-1165 (Year: 1998).
Leonard, R. "Continuous Hot Dip Coatings," *Corrosion: Fundamentals, Testing, and Protection,* vol. 13A, ASM Handbook, *ASM International,* 2003, p. 786-796 (Year: 2003).
Mori, K., Warm and Hot Stamping of Ultra High Tensile Strength Steel Sheets Using Resistance Heating.
Naderi, Malek, Semi-hot Stamping as an Improved Process of Hot Stamping (2011).
Liu, Hong-Sheng, Hot Formation Quality of Hight Strength Steel BR1500HS for Hot Stamping without Cooling System (2012).
Yi, H.L., Dual-Phase Hot-Press Forming Alloy (2010).
Ghanbari, Zahra N., Zinc Coated Sheet Steel for Press Hardening (MS Thesis).
Grajcar, Adam et al.; "Phase Equilibrium and Austenite Decomposition in Advanced High-Strength Medium-Mn Bainitic Steels"; www.mdpi.com/journal/metals; Oct. 20, 2016; 14 pages.
Wang, Jianfeng et al.; U.S. Appl. No. 15/417,921, filed Jan. 27, 2017 entitled "Two-Step Hot Forming of Steels"; 45 pages.
Wang, Jianfeng; U.S. Appl. No. 15/141,272, filed Apr. 28, 2016 entitled "Zinc-Coated Hot Formed High Strength Steel Part With Through-Thickness Gradient Microstructure"; 45 pages.
First Office Action for German Patent Application No. 102018101735.9 dated May 3, 2019 with correspondence from Manitz Finsterwald and Partner summarizing contents, 6 pages.
Jianfeng Wang et al., U.S. Appl. No. 15/435,418, filed Feb. 17, 2017 entitled "Mitigating Liquid Metal Embrittlement in Zinc-Coated Press Hardened Steels," 40 pages.
Second Office Action for Chinese Patent Application No. 201511036174.4 dated Nov. 16, 2017 and English language machine translation provided by Espacenet; 34 pages.
First Office Action for Chinese Patent Application No. 201710222523.4 dated Apr. 27, 2018 and correspondence from China Patent Agent (H.K.) Ltd summarizing Office Action; 9 pages.
First Office Action for Chinese Patent Application No. 201710224443.2 dated May 3, 2018 and correspondence from China Patent Agent (H.K.) Ltd summarizing Office Action; 9 pages.
"Process to improve oxidation resistance of press hardening steels," Research Disclosure, Database No. 641010 (Published online: Jul. 28, 2017), 2 pages.
Lu, Qi et al., International Application No. PCT/CN2018/088122 filed May 24, 2018 entitled "A Method for Improving Both Strength and Ductility of a Press-Hardening Steel," 32 pages.
Pang, Jiachen et al., International Application No. PCT/CN2018/091751 filed Jun. 19, 2018 entitled "Low Density Press-Hardening Steel Having Enhanced Mechanical Properties," 44 pages.
International Search Report and Written Opinion for International Application No. PCT/CN2016/110241 dated Sep. 25, 2017, 12 pages (ISA/CN).
International Search Report and Written Opinion for International Application No. PCT/CN2017/119484 dated Sep. 12, 2018, 9 pages (ISA/CN).
International Search Report and Written Opinion for International Application No. PCT/CN2018/091751 dated Mar. 15, 2019, 9 pages (ISA/CN).
Lu, Qi et al., U.S. Appl. No. 16/460,369, filed Jul. 2, 2019 entitled, "Press Hardened Steel With Surface Layered Homogenous Oxide After Hot Forming," 50 pages.
"Steel Definitions, Today's AHSS for Automotive" WorldAutoSteel, [retrieved on Nov. 27, 2019]. Retrieved from the Internet: <URL: https://www.worldautosteel.org/steel-basics/automotive-steel-definitions/ <https://protect-us.mimecast.com/s/qVeXCADQNWCNqxzXcGLKQI>, 5 pages.
"TRIP steel" Wikipedia, [retrieved on Nov. 27, 2019], retrieved from the Internet: <URL: https://en.wikipedia.org/wiki/TRIP_steel>, 3 pages.
"Transformation-Induced Plasticity (TRIP) Steel" WorldAutoSteel, [retrieved on Nov. 27, 2019]. Retrieved from the Internet: <URL:https://www.worldautosteel.org/steel-basics/steel-types/transformation-induced-plasticity-trip-steel/>, 5 pages.
English translation provided by Espacenet for CN 102031456-A.
English translation provided by Thomson Innovation for CN 102284523-A.
English translation provided by Espacenet for CN 102828109-A.
U.S. Pat. No. 8,882,697-B2 is believed to be the English equivalent of CN 102906291-A.
English translation provided by Espacenet for CN 102912219-A.
English translation provided by Thomson Innovation for JP 3084378-A.
English translation provided by Thomson Innovation for JP 2003201549-A.
English translation provided by Thomson Innovation for JP 2011016149-A.
U.S. Pat. No. 8,926,770-B2 is believed to be the English equivalent of JP 5015356-B2.
English translation provided by Thomson Innovation for KR 2011034452-A.
English translation provided by Thomson Innovation for SU 711126-A1.

ZINC-COATED HOT FORMED STEEL COMPONENT WITH TAILORED PROPERTY

FIELD

The present disclosure relates to zinc-coated hot-formed steel components having tailored properties and methods for selectively tailoring the properties of hot-formed steel components by selective cooling and quenching.

BACKGROUND

This section provides background information related to the present disclosure which is not necessarily prior art.

In various manufacturing processes, such as manufacturing in the automobile industry, sheet metal panels or blanks may be stamped, where the sheet metal panel is pressed between a pair of dies, to create a complex three-dimensional shaped component. A sheet metal blank is usually first cut from a coil of metal material. The sheet metal material is chosen for its desirable characteristics, such as strength, ductility, and other properties related to the metal alloy.

Different techniques have been used to reduce the weight of a vehicle, while still maintaining its structural integrity. For example, tailor-welded blank assemblies are commonly used to form structural components for vehicles that need to fulfill specialized load requirements. For example, the B-pillar structural component of a car body desirably exhibits a relatively high structural rigidity in the areas corresponding to the body of the occupant, while having increased deformability in the lower region at or below the occupant's seat to facilitate buckling of the B-pillar below seat level when force or impact is applied. As the structural component has different performance requirements in different regions, such a component has been made with multiple distinct pieces assembled together to form what is known as a "tailored blank assembly" or "tailored weld assembly" (also often referred to as a "tailor welded blank," or "tailor welded coil"). By way of non-limiting example, tailor welded blank assemblies may be used to form structural components in vehicles, for example, structural pillars (such as A-pillars, B-pillars, C-pillars, and/or D-pillars), hinge pillars, vehicle doors, roofs, hoods, trunk lids, engine rails, and other components with high strength requirements.

A tailored blank assembly typically includes at least one first metal sheet or blank and a second metal sheet or blank having at least one different characteristic from the first sheet. For example, steel blanks or steel strips having different strength, ductility, hardness, thicknesses, and/or geometry may be joined. After joining, the desired contour or three-dimensional structure is created, for example, by a cold forming process or hot forming process (e.g., like the stamping process described above). Thus, adjoining edges of the first and second sheets may be metallurgically or mechanically interlocked together, for example, by making a weld, junction, or other connection along the adjoining edges to interlock them with one another. Thereafter, the permanently affixed sheets or blanks may be processed to make a shaped or formed sheet metal assembly product. Notably, the tailor blank assembly is not limited to solely two sheets or blanks, rather three or more sheets or blanks may be joined together and shaped to form the assembly.

However, creating tailor blank assemblies is relatively cost-intensive due to the numerous steps and manufacturing processes involved. For example, the initial work piece blanks need to be individually cut, then joined in an assembly process, followed by the forming or shaping processes.

In addition, issues with the structural component may potentially arise due to the presence of a joint or junction, such as a weld line. For example, the weld line or connection between the blanks may provide a site for localized strain that may alter the properties of the structural component and/or potentially cause premature failure. Further, in subsequent hot forming processes, the effect of the heat from welding may cause changes in the welding seam that can ultimately lead to softening at the welding seam(s) in the finished component, which could potentially compromise the quality and functionality of such a tailor blank assembly. It would be desirable to develop alternative new methods for forming structural components that must exhibit variable properties in different regions, especially high-strength components that can replace conventional tailor blank assemblies.

SUMMARY

This section provides a general summary of the disclosure, and is not a comprehensive disclosure of its full scope or all of its features.

In certain aspects, the present disclosure provides a method of selectively quenching regions of a high-strength steel component. The method may comprise selectively cooling at least one region of a hot-formed press-hardened component comprising a high-strength transformation induced plasticity (TRIP) steel.

The TRIP steel may be selected from the group consisting of:
  (i) a Mn-TRIP steel comprising:
    manganese (Mn) at greater than or equal to about 4% by weight of the total steel composition, and
    carbon (C) at greater than or equal to about 0.1% by weight to less than or equal to about 0.4% by weight, and
  (ii) a delta-TRIP steel comprising:
    aluminum (Al) at greater than or equal to about 3% by weight to less than or equal to about 6% by weight of the total steel composition;
    manganese at greater than or equal to about 0.1% by weight to less than or equal to about 1% by weight of the total steel composition; and
    carbon at greater than or equal to about 0.3% by weight to less than or equal to about 0.5% by weight. The hot-formed press-hardened component has a microstructure comprising greater than or equal to about 5% by volume retained austenite in a matrix of martensite. The selective cooling quenches and cools the at least one region to a temperature of less than or equal to about −40° C. and forms at least one quenched region comprising less than or equal to about 1% by volume austenite.

In other aspects, the present disclosure provides a method of selectively quenching regions of a high-strength steel component comprising: selectively cooling at least one region of a zinc-coated hot-formed press-hardened component comprising a high-strength transformation induced plasticity (TRIP) steel having a surface coating comprising zinc. The TRIP steel may be selected from the group consisting of:
  (i) a Mn-TRIP steel comprising:
    manganese (Mn) at greater than or equal to about 4% by weight of the total steel composition, and
    carbon (C) at greater than or equal to about 0.1% by weight to less than or equal to about 0.4% by weight, and (ii) a delta-TRIP steel comprising:
  aluminum (Al) at greater than or equal to about 3% by weight to less than or equal to about 6% by weight of the total steel composition;
  manganese at greater than or equal to about 0.1% by weight to less than or equal to about 1% by weight of the total steel composition; and
  carbon at greater than or equal to about 0.3% by weight to less than or equal to about 0.5% by weight. The zinc-coated hot-formed press-hardened component has a microstructure comprising greater than or equal to about 5% by volume retained austenite in a matrix of martensite prior to the selective cooling. The selective cooling quenches and cools the at least one region to a temperature of less than or equal to about −40° C. and forms at least one quenched region comprising less than or equal to about 1% by volume austenite.

In yet other aspects, the present disclosure provides a zinc-coated hot-formed press-hardened tailor quenched component comprising at least one selectively quenched region comprising less than or equal to about 1% by volume austenite. The component comprises a high-strength transformation induced plasticity (TRIP) steel having a surface coating comprising zinc. The steel is selected from the group consisting of:
(i) a Mn-TRIP steel comprising:
  manganese (Mn) at greater than or equal to about 4% by weight of the total steel composition, and
  carbon (C) at greater than or equal to about 0.1% by weight to less than or equal to about 0.4% by weight, and
(ii) a delta-TRIP steel comprising:
  aluminum (Al) at greater than or equal to about 3% by weight to less than or equal to about 6% by weight of the total steel composition;
  manganese at greater than or equal to about 0.1% by weight to less than or equal to about 1% by weight of the total steel composition; and
  carbon at greater than or equal to about 0.3% by weight to less than or equal to about 0.5% by weight. The component is substantially free of liquid metal embrittlement (LME). In certain aspects, the component is a tailor quenched blank for an automotive or vehicular application.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
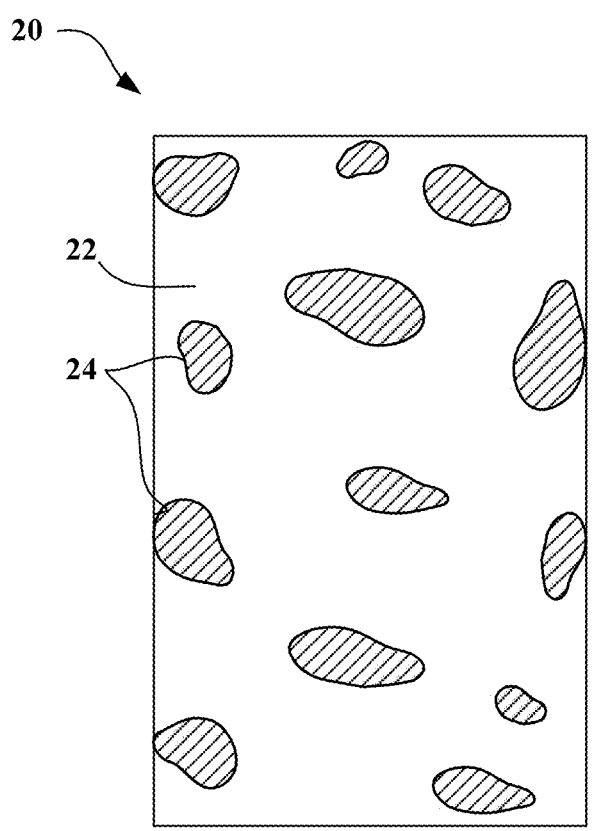
FIG. 1 shows an exemplary schematic of a high-strength high manganese transformation induced plasticity (TRIP) steel alloy microstructure having a matrix of martensite with a distributed phase of retained austenite after hot forming and press hardening.

Example embodiments will now be described more fully with reference to the accompanying drawings.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

As used herein, all amounts are weight % (or mass %), unless otherwise indicated.

In addition, disclosure of ranges includes disclosure of all values and further divided ranges within the entire range, including endpoints and sub-ranges given for the ranges.

As referred to herein, the word "substantially," when applied to a characteristic of a composition or method of this disclosure, indicates that there may be variation in the characteristic without having a substantial effect on the chemical or physical attributes of the composition or method.

Example embodiments will now be described more fully with reference to the accompanying drawings.

The present disclosure pertains to methods of forming high-strength components from high-strength steel alloys, such as transformation induced plasticity (TRIP) steels. A high-strength steel is one that has an ultimate tensile strength of greater than or equal to about 1,000 megapascals (MPa), for example, greater than or equal to about 1,400 MPa to less than or equal to about 2,200 MPa. In certain aspects, the high-strength TRIP steel alloy comprises manganese at relatively high amounts, for example, at greater than or equal to about 4% by mass or weight of the total the high-strength TRIP steel alloy composition. Such a high-strength TRIP steel alloy having manganese at a nominal amount of above 4% by weight may be considered to be a high-strength high manganese transformation induced plasticity (TRIP) steel alloy microstructure or Mn-TRIP steel. In certain variations, the Mn-TRIP steel alloy may comprise manganese at greater than or equal to about 4% by weight to less than or equal to about 12% by weight of the total composition. The high-strength Mn-TRIP steel alloy may further comprise carbon present at greater than or equal to about 0.1% by weight to less than or equal to about 0.4% by weight.

In certain variations, the high-strength Mn-TRIP steel alloy optionally comprises manganese at greater than or equal to about 4% by weight to less than or equal to about 12% by weight of the total composition; carbon present at greater than or equal to about 0.3% by weight to less than or equal to about 0.5% by weight; one of more of the following alloying ingredients: silicon greater than or equal to about 0.1% by weight to less than or equal to about 0.5% by weight; chromium at less than or equal to about 1% by weight; titanium present at less than or equal to about 0.2% by weight; aluminum present at less than or equal to about 0.1% by weight; phosphorus present less than or equal to about 0.2% by weight; sulfur present less than or equal to about 0.05% by weight; and one or more impurities cumulatively present at less than or equal to about 0.5% by weight, preferably at less than or equal to about 0.1% by weight, and a balance iron.

Suitable variations of a high-strength Mn-TRIP steel alloy may include a 7Mn-TRIP steel, a 10-Mn-TRIP steel, and the like. 7Mn-TRIP steel has a nominal manganese content of approximately 7% by weight of the total alloy composition, while 10 Mn-TRIP steel has a nominal manganese content of approximately 10% by weight of the overall alloy composition.

Other high-strength TRIP steel alloys may include delta-TRIP steel (δ-TRIP steel), where the high-strength TRIP steel alloy has a greater concentration of aluminum than silicon. For example, a delta-TRIP steel may have the following composition: aluminum present at greater than or equal to about 3% by weight to less than or equal to about 6% by weight of the total composition; manganese at greater than or equal to about 0.1% by weight to less than or equal to about 1% by weight of the total composition; carbon present at greater than or equal to about 0.3% by weight to less than or equal to about 0.5% by weight; one of more of the following alloying ingredients: silicon greater than or equal to about 0.1% by weight to less than or equal to about 0.5% by weight; chromium at less than or equal to about 1% by weight; titanium present at less than or equal to about 0.2% by weight; phosphorus present less than or equal to about 0.2% by weight; sulfur present less than or equal to about 0.05% by weight; and one or more impurities cumulatively present at less than or equal to about 0.5% by weight, preferably at less than or equal to about 0.1% by weight, and a balance iron.

By way of non-limiting example, the methods of the present disclosure pertain to certain high-strength TRIP steels, such as a Mn-TRIP steel, a delta-TRIP steel, and the like. In certain aspects, such select high-strength TRIP steel alloys have a microstructure with a retained austenite embedded in a primary matrix of martensite after a hot stamping and/or press-hardening process. For example, as shown in FIG. 1, a select high-strength Mn-TRIP steel alloy 20 includes a matrix of martensite 22 with a distributed phase of retained austenite 24. The phases as shown in the schematic are merely representative and may have distinct morphology/shapes, sizes, and distributions. Notably, other high-strength alloys, such as press hardened steel (PHS)/boron steels, typically have about 100% martensite after press-hardening and hot stamping. However, the high-strength Mn-TRIP steel alloy 20 has greater than or equal to about 5% by volume to less than or equal to about 30% by volume of retained austenite 24, optionally greater than or equal to about 8% by volume to less than or equal to about 12% by volume, and in certain aspects, about 10% by volume of retained austenite.

By way of background, hot forming of the select high-strength TRIP steels, such as Mn-TRIP steel and delta-TRIP steel may be conducted as follows. A sheet or blank of high-strength TRIP steel alloy may be formed into a three-dimensional component via hot forming. Such a high-strength three-dimensional component may be incorporated into a device, such as a vehicle. While the high-strength structures are particularly suitable for use in components of an automobile or other vehicles (e.g., motorcycles, boats, tractors, buses, motorcycles, mobile homes, campers, and tanks), they may also be used in a variety of other industries and applications, including aerospace components, consumer goods, office equipment and furniture, industrial equipment and machinery, farm equipment, or heavy machinery, by way of non-limiting example. Non-limiting examples of components and vehicles that can be manufactured by the current technology include automobiles, tractors, buses, motorcycles, boats, mobile homes, campers, and tanks. Other exemplary structures that have frames that can be manufactured by the current technology include construction and buildings, such as houses, offices, bridges, sheds, warehouses, and devices. The high-strength structural automotive component may be selected from the group consisting of: rocker rails, structural pillars, A-pillars, B-pillars, C-pillars, D-pillars, bumper, hinge pillars, cross-members, body panels, vehicle doors, roofs, hoods, trunk lids, engine rails, and combinations thereof in certain variations.

High-strength TRIP steels that are press-hardened into PHS components may require cathodic protection. The PHS component may be coated prior to applicable pre-cold forming or before austenitization. Coating the PHS component provides a protective layer to the underlying steel component. Such coatings typically include an aluminum-silicon alloy and/or zinc. Zinc coatings offer cathodic protection; the coating acts as a sacrificial layer and corrodes instead of the steel component, even where the steel is exposed. However, liquid metal embrittlement (LME) may occur when a metallic system is exposed to a liquid metal, such as zinc, during forming at high temperature, resulting in potential cracking and a reduction of total elongation or diminished ductility of a material. LME may also result in decreased ultimate tensile strength. To avoid LME in conventional PHS processes for conventional high-strength steels, numerous additional processing steps are conducted, adding processing time and expense.

Figure 2:
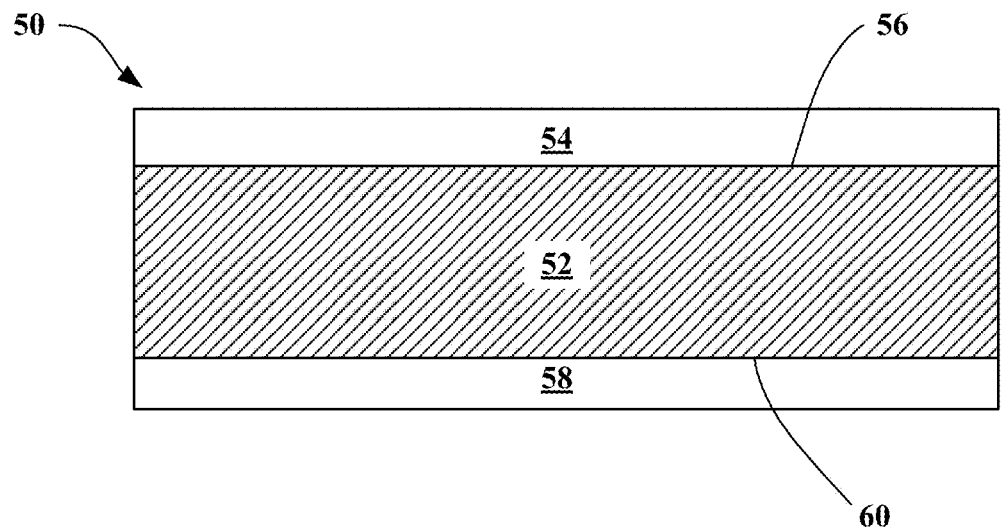
FIG. 2 shows a simplified cross-sectional schematic of a zinc-coated sheet blank having a corrosion coating applied to two sides prior to hot forming and press hardening.

FIG. 2 shows a cross-sectional view of a sheet blank 50 that may be formed from a metal stock or coil in a blanking operation, for example, by cutting. The sheet blank 50 includes a main base layer 52 formed of a high-strength TRIP steel like the compositions previously discussed above. A first coating layer 54 may be formed on a first side 56 of the main base layer 52, while a second coating layer 58 may be formed on a second opposite side 60 of the main base layer 52. The first coating layer 54 and the second coating layer 58 may be corrosion protection coatings. While shown on both the first and second sides 56, 60 of the main base layer 52, the first coating layer 54 and the second coating layer 58 may be optionally omitted from either or both sides. In certain aspects, the first coating layer 54 and the second coating layer 58 comprise zinc, for example, such coatings may be zinc or an alloy of zinc and thus predominantly comprise zinc at greater than about 90%. It should be appreciated, however, that the composition of the first coating layer 54 and the second coating layer 58 is not limited to comprising zinc, but may further include additional elements. The sheet blank 50 thus undergoes the hot forming process to provide a three-dimensionally formed component.

During hot forming, the sheet blank may be introduced into a furnace or other heat source. The amount of heat applied to the sheet blank heats and soaks the sheet blank to a temperature of at least the austenitization temperature of the select high-strength TRIP steel. In certain aspects, the high-strength TRIP steel has an austenitization temperature (T1) of greater than or equal to about 750° C. to less than or equal to about 850° C., optionally less than or equal to about 782° C. in certain variations. Such an austenitization temperature is far below that for typical PHS/boron steels (e.g., 22MnB5 alloy that has low manganese levels and no aluminum), which are typically austenitized at a temperature in the range of about 880° C. to 950° C. As will be described further below, in certain aspects, the sheet blank may have a surface layer comprising zinc for corrosion protection. Zinc has a melting temperature of 420° C. and, at 782° C., begins to react with iron via a eutectoid reaction and forms a brittle phase that results in liquid metal embrittlement (LME). Where temperatures are favorable (e.g., above 782° C. in certain high-strength Mn-TRIP steel) and the zinc is a liquid metal, during deformation processes, the zinc can wet freshly exposed grain boundaries (of the phase in the substrate) and cause de-cohesion/separation along the grain boundary. The zinc thus attacks grain boundaries, especially where austenite is present, which can undesirably form cracks associated with LME. The sheet blank is soaked for a period long enough to austenitize the high-strength TRIP steel to a desired level.

After exiting the furnace, the sheet blank can be transferred into a stamping press. The stamping press may include a die having a cooling system or mechanism. For example, the die(s) may have a water-cooling system, which are well known in the art. The die is designed to form a desired final three-dimensional shape of the component from the austenitized sheet blank. The die may include a first forming die and a second forming die that are brought together to form the desired final shape of the three-dimensional component therebetween.

The cooled dies thus may quench the formed sheet blank in a controlled manner across surfaces of the formed component to cause a phase transformation from austenite to martensite. Therefore, the first and second die may cooperate to function as a heat sink to draw heat from, and otherwise quench, the formed component. In certain variations, the high-strength TRIP steel has a critical cooling rate that is the slowest rate of cooling to produce a hardened martensitic condition of greater than about 70 volume % in the component. In one aspect, the critical cooling rate for the high-strength TRIP steel is no greater than about 10 Kelvin/second (K/s). However, it should be appreciated that high-strength TRIP steel may have lower critical cooling rates, such as about 1 K/s. The select high-strength TRIP steels of the present disclosure not only greatly reduce the austenitization temperature, but also significantly shift the ferritic and pearlitic transformation curves of the continuously cooling transformation (CCT) diagram to the right, allowing more time, so the critical cooling rate can be slower. The lower critical cooling rate improves the hardenability of the TRIP steel and makes processing conditions less demanding. For example, the lower critical cooling rate has the following impact on die design: (i) less demand on complex cooling channels, (ii) less sensitivity to die re-tooling, and/or (iii) less demand on uniformity of cooling rate. However, the die may still be cooled as quickly as possible to maintain processing through-put.

During the hot forming of the three-dimensional component, the temperature of the sheet blank is desirably kept below about 782° C. to avoid forming a zinc iron (ZnFe) phase/compound, which depletes zinc from the coating layers (the first coating layer 54 and the second coating layer 58 in the sheet blank 50 in FIG. 2). In this manner, LME described above can be significantly reduced or eliminated. As such, an increased zinc concentration on the hot formed component results in improved corrosion protection.

Accordingly, in variations where the starting material has a zinc coating on one or both sides, the press-hardened component is substantially free of liquid metal embrittlement. The zinc coating may be applied by conventional methods, such as hot dip galvanizing. The term "substantially free" as referred to herein means that the LME microstructures and defects are absent to the extent that undesirable physical properties and limitations attendant with their presence are minimized or avoided (e.g., cracking, loss of ductility, and/or loss of strength). In certain embodiments, a PHS component that is "substantially free" of LME defects comprises less than about 5% by weight of the LME species or defects, more preferably less than about 4% by weight, optionally less than about 3% by weight, optionally less than about 2% by weight, optionally less than about 1% by weight, optionally less than about 0.5% and in certain embodiments comprises 0% by weight of the LME species or defects.

A method of press-hardening a high-strength TRIP steel alloy is thus provided that comprises creating a blank having a zinc-coated high-strength TRIP steel alloy. The blank is heated to a temperature of less than or equal to about 782° C. to partially austenitize the zinc-coated steel alloy. The blank is then press hardened and quenched in a die to form a press-hardened component having a multi-phase microstructure, such as the exemplary microstructure 20 formed in FIG. 1. While the retained austenite 26 in the martensite matrix 24 provides greater ductility and/or energy absorption, the retained austenite 26 in the martensite matrix 24 also diminishes hardness as compared with a fully martensitic microstructure. In certain aspects, after hot forming/press hardening, a microstructure is formed that has a retained austenite present at greater than or equal to about 5% to less than or equal to about 30% by volume and a balance of martensite at greater than or equal to about 70% by volume to less than or equal to about 95% by volume. In certain variations, the present disclosure provides methods for selectively increasing hardness of the select high-strength TRIP steel alloys after these hot forming processes by a selective cooling and quenching process.

In certain aspects, the hardness is increased via a selective cooling process where the surface is quenched via cooling and thus hardened. Subjecting one or more regions of the hot formed component to selective cooling serves to transform retained austenite near the surface of the part into martensite. In this manner, different microstructures are formed through different regions of the component, where the microstructure transitions from a high volume of martensite, for example, 98-100% martensite, into a region where the microstructure has less martensite, for example, greater than or equal to about 70% by volume to less than or equal to about 95% by volume with the balance being retained austenite.

Figure 3:
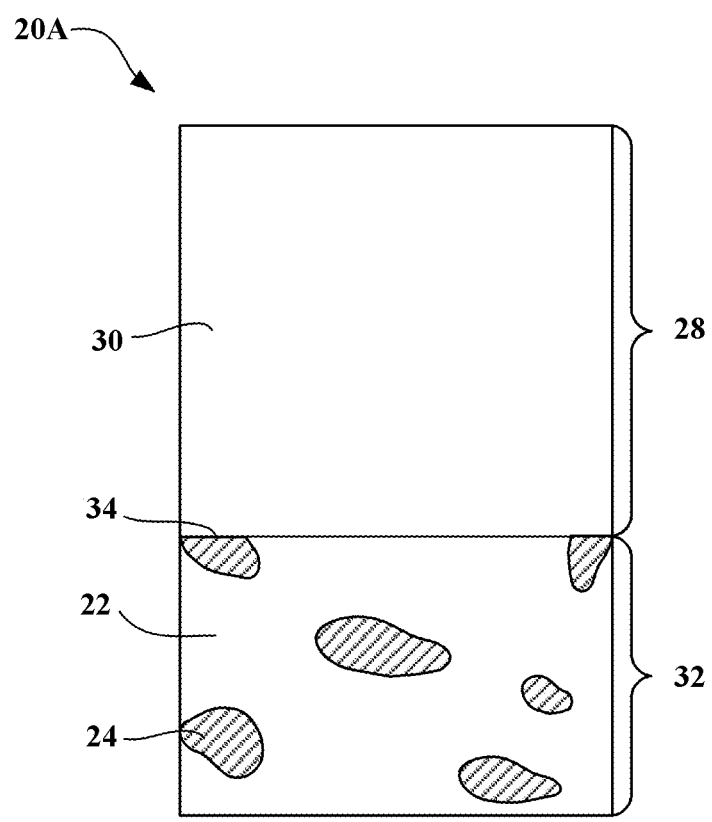
FIG. 3 shows an exemplary schematic of a hot-formed press-hardened high-strength high manganese transformation induced plasticity (TRIP) steel alloy microstructure having a matrix of martensite with a distributed phase of retained austenite in a lower region and a quenched region that is selectively cooled and hardened in accordance with certain aspects of the present disclosure.

As shown in FIG. 3, a hot-formed press-hardened select high-strength Mn-TRIP steel alloy 20A has a microstructure that includes a matrix of martensite 22 with a distributed phase of retained austenite 24. The phases shown in the schematic are merely representative and may have distinct morphology/shapes, sizes, and distributions. However, a quenched region 28 has been selectively cooled and therefore comprises a martensite microstructure 30. In certain variations, the martensite 30 in the quenched region 28 is present at greater than or equal to about 98% by volume, optionally greater than or equal to about 99% by volume, optionally greater than or equal to about 99.5% by volume, optionally greater than or equal to about 99.7% by volume, and in certain variations, optionally greater than or equal to about 99.9% by volume martensite 30. Stated in another way, the retained austenite in the quenched region 28 is less than or equal to about 2% by volume, optionally less than or equal to about 1% by volume, optionally less than or equal to about 0.5% by volume, optionally less than or equal to about 0.3% by volume, optionally less than or equal to about 0.1% by volume.

A lower region 32 of the high-strength Mn-TRIP steel alloy 20A remains intact and unquenched therefore having greater than or equal to about 5% by volume to less than or equal to about 30% by volume of retained austenite 24, optionally greater than or equal to about 8% by volume to less than or equal to about 12% by volume, and in certain aspects, about 10% by volume of retained austenite in the matrix of martensite 22. As can be seen, retained austenite is at least partially transformed into martensite in the quenched region 28. A transition region 34 between the quenched region 28 and the unquenched lower region 32 may be formed, depending on the nature and extent of the surface hardening process.

A selective cooling process is used on a hot stamped part to transform the surface having retained austenite to martensite and thus forming a hardened and quenched region, while the unquenched microstructure remains the same. When cooled, the retained austenite near the surface transforms to martensite, and hence increasing the strength of the material. In this manner, the quenched region can exhibit greater hardness levels, while the unquenched region exhibits greater ductility and/or energy absorption properties. Retained austenite improves ductility as it transforms to martensite during deformation, and hence delaying fracture. Therefore, retained austenite also improves energy absorption. In certain variations, the selectively quenched region(s) may have a greater ultimate tensile strength than the unquenched region(s). By way of non-limiting example only, a representative strength in the quenched region may be greater than or equal to about 1,400 MPa while the unquenched region(s) may have a strength of less than or equal to about 1,400 MPa. The mechanical performance of the hot stamped component is significantly improved, such as fatigue strength and static/dynamic load bearing capability after the selective cooling process.

The selectively quenched and hardened region may be formed on select areas of a three-dimensional press-hardened part. In various aspects, the selective cooling process is targeted at select regions of the component so as to provide two distinct regions having distinct microstructures. Thus, the at least one selectively quenched region has a first microstructure and is adjacent to one or more unquenched regions in the component having a second microstructure. A transition between the first and second microstructures may occur, the thickness of which may vary depending on the selective cooling process employed to form the at least one selectively quenched and hardened region.

In certain aspects, the selective cooling process may selectively quench and cool at least one region of a hot-formed press-hardened component formed of a high-strength transformation induced plasticity (TRIP) steel to a temperature of less than or equal to about −40° C. The temperature of the component is reduced to induce transformation of retained austenite, which is metastable, into martensite. In certain aspects, the temperature is less than or equal to about −0° C., optionally less than or equal to about −10° C., optionally less than or equal to about −25° C., optionally in certain preferred aspects less than or equal to about −40° C., optionally less than or equal to about −50° C., optionally less than or equal to about −60° C., optionally less than or equal to about −70° C., and in certain variations, optionally less than or equal to about −75° C.

In certain aspects, the selective cooling is achieved by contacting one or more predetermined regions of a hot-formed press-hardened component comprising a high-strength transformation induced plasticity (TRIP) steel with a cooling medium. In certain aspects, the contacting may be achieved by submerging or dipping the at least one region of the component into a cooling medium, such as a bath or moving stream of cooling medium. In such a process, exemplary cooling media may be selected from the group consisting of: water, liquid nitrogen, and combinations thereof. In other aspects, the selective cooling may comprise spraying the at least one region of the component with a cooling medium. In certain aspects, the spray may be pressurized and directed via a nozzle. The cooling medium may be in the form of a gas, a vapor or mist, a liquid, and/or a solid. For example, the cooling medium for such a process may be selected from the group consisting of: air, water, liquid nitrogen, solid carbon dioxide (e.g., dry ice particles), and combinations thereof. The cooling medium is directed towards or contacted with the one or more select regions of the component to induce cooling, quenching, and therefore transformation of retained austenite into martensite. Certain regions of the component may protected from exposure to selective cooling by use of shielding with a mask/protective barrier or only directing the cooling medium towards select regions of the surface.

In certain aspects, the cooling medium has a temperature as it is directed towards the one or more select regions of the substrate of less than or equal to about −40° C., optionally less than or equal to about −50° C., optionally less than or equal to about −60° C., optionally less than or equal to about −70° C., and in certain variations, optionally less than or equal to about −75° C.

Figure 4:
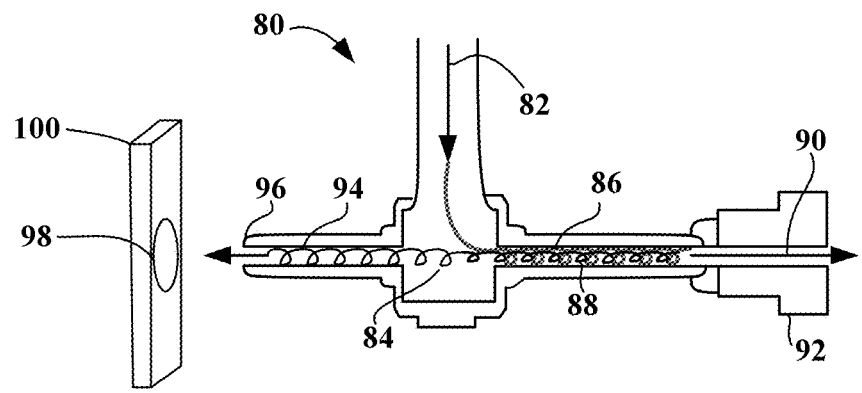
FIG. 4 shows an exemplary simplified vortex tube cooling device for selectively cooling a substrate of a hot-formed press-hardened high-strength high manganese transformation induced plasticity (TRIP) steel alloy in accordance with certain aspects of the present disclosure.

In certain variations, selective cooling can be conducted by using a vortex tube that generates cold air or mist that can be directed at the component. An exemplary simplified vortex tube cooling device 80 is shown in FIG. 4. The vortex tube cooling device 80 includes a compressed air inlet 82 through which compressed air flows and enters a stationary vortex generating chamber 84. Compressed air may be introduced at 70° F. (about 21° C.). An outer vortex stream 86 is generated and an inner vortex stream 88 is also formed. The outer vortex stream 86 gains heat from energy lost in the inner vortex stream 88. Hot air exhaust 90 (e.g., having a temperature of greater than 230° F. (about 110° C.)) can be vented out of the vortex tube cooling device 80 through an adjustable control valve 92. Residual air flows back towards the stationary vortex generating chamber 84 and thus generates the inner vortex stream 88, which loses energy and is cooled. A cooled air stream 94 passes through the stationary vortex generating chamber 84 and through an outlet 96 where it is directed towards a target region 98 of a surface of a substrate 100 to be selectively cooled and quenched. The substrate 100 or the vortex tube cooling device 80 may be moved relative to one another to cover various target regions 98 of the surface of the substrate 100. The volume and temperature of the cooled air stream 94 can be controlled by adjusting the adjustable control valve 92. In certain operational modes, the cooled air stream 94 is super-cooled and may have a temperature of −40° F. (about −40° C.).

Figure 5:
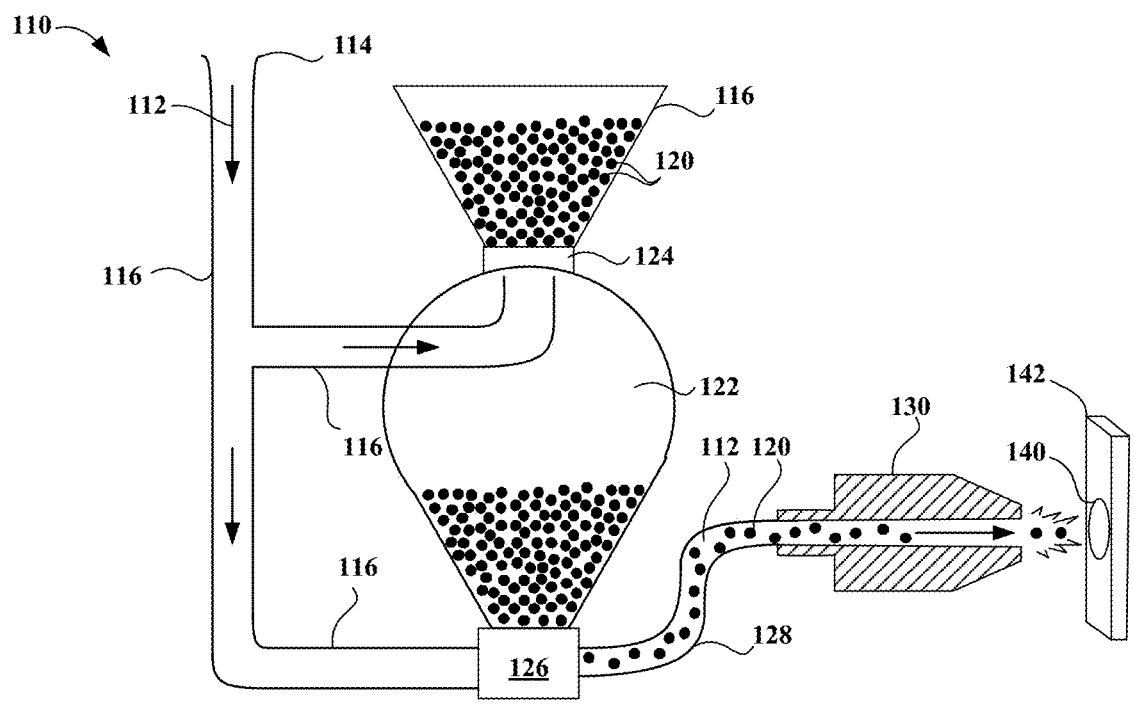
FIG. 5 shows an exemplary simplified dry ice shot blasting device for selectively cooling a substrate of a hot-formed press-hardened high-strength high manganese transformation induced plasticity (TRIP) steel alloy in accordance with certain aspects of the present disclosure.

In other variations, selective cooling can include shot blasting with cold media, such as dry ice (solid carbon dioxide). By using such a shot blasting device, the component can be selectively treated by both lowering temperature and inducing mechanical work. An exemplary simplified dry ice shot blasting device 110 is shown in FIG. 5, where compressed gas, such as compressed air 112, is introduced via an inlet 114 and transported within conduits 116 throughout the device 110. A feed hopper 116 holds cooling media in the form of pellets or particles 120. In certain variations, the particles or pellets 120 may be dry ice particles. Dry ice or solidified carbon dioxide has an average temperature of about −108.4° F. (−78° C.) or lower. The feed hopper 116 may be insulated or have cooling systems. The particles 120 are fed into a chamber 122 at an inlet 124. A stream of compressed gas enters the chamber 122 near the feed hopper 116 and can be used to insufflate the particles 120 and thus facilitate their flow into chamber 122. Again, chamber 122 may be insulated or have separate cooling systems. The chamber 122 has an outlet 126 which may include an associated metering device/valve system to regulate flow of both the compressed air 112 and particles 120. After the outlet 126, a plurality of particles 120 are entrained in compressed air 112 and fed in a conduit 128 to a nozzle 130, which may include a flow regulator (not shown). A plurality of particles 120 are ejected from a nozzle outlet 132 and directed towards a target region 140 of a surface of a substrate 142 to be selectively cooled and quenched. The substrate 142 or the nozzle 130 may be moved relative to one another to cover various target regions 140 of the surface of the substrate 142. These methods of selectively cooling the substrate discussed above are illustrative of suitable embodiments, however, other methods and devices for selectively cooling a steel substrate are likewise contemplated in alternative variations of the present disclosure.

A microstructure treated in accordance with the methods of the present disclosure can have a hot-formed press-hardened part with improved resistance against bending, by enhancing strength near the surface, with extra martensite generated by selective cooling and quenching. Further, the selective cooling process, especially where the cooling medium includes particles, can mitigate the risks of micro-crack propagation in the zinc-coating in press-hardened component by introducing compressive residual stress at the surface after directing particles towards the surface for selective cooling. Accordingly, selective cooling a press hardened component can improve functional performance of a hot formed steel component (zinc-coated or bare), such as improving fatigue strength and impact under service load (especially bending loads).

In certain other aspects, the hot formed components having a zinc coating formed in accordance with the present teachings have improved anti-corrosion performance as compared to conventional aluminum-silicon coated press hardened steel components. As noted above, the austenitizing temperature is below the temperature at which undesirable compounds form between zinc and iron, thus helping to minimize LME. After hot forming, the selective cooling process further closes micro-cracks in a zinc-coating, thus minimizing or eliminating risk of crack propagation that can cause corrosion. The present technology thus enables zinc-coated press hardened components formed of high-strength TRIP steel having improved corrosion performance formed at a lower cost (compared to conventional aluminum silicon coatings).

The present disclosure thus provides in certain aspects, a zinc-coated hot-formed press-hardened component. Such a component may be a tailor quenched blank. The component comprises at least one quenched and hardened region formed after the hot forming and press-hardening. The quenched region comprises less than or equal to about 2% by volume austenite, and in certain aspects, optionally less than or equal to about 1% by volume austenite, while a second unquenched region comprising greater than or equal to about 5% by volume retained austenite in a matrix of martensite. The component may comprise a high-strength transformation induced plasticity (TRIP) steel having a surface coating comprising zinc. The component is substantially free of liquid metal embrittlement (LME). The TRIP steel may be selected from the group consisting of:
  (i) a Mn-TRIP steel comprising:
    manganese (Mn) at greater than or equal to about 4% by weight of the total steel composition, and
    carbon (C) at greater than or equal to about 0.1% by weight to less than or equal to about 0.4% by weight, and (ii) a delta-TRIP steel comprising:
    aluminum (Al) at greater than or equal to about 3% by weight to less than or equal to about 6% by weight of the total steel composition;
    manganese at greater than or equal to about 0.1% by weight to less than or equal to about 1% by weight of the total steel composition; and
    carbon at greater than or equal to about 0.3% by weight to less than or equal to about 0.5% by weight. Any of the TRIP steels discussed previously above can form the zinc-coated hot-formed press-hardened component. Likewise, the surface coating comprising zinc may be like those previously described.

Figure 6:
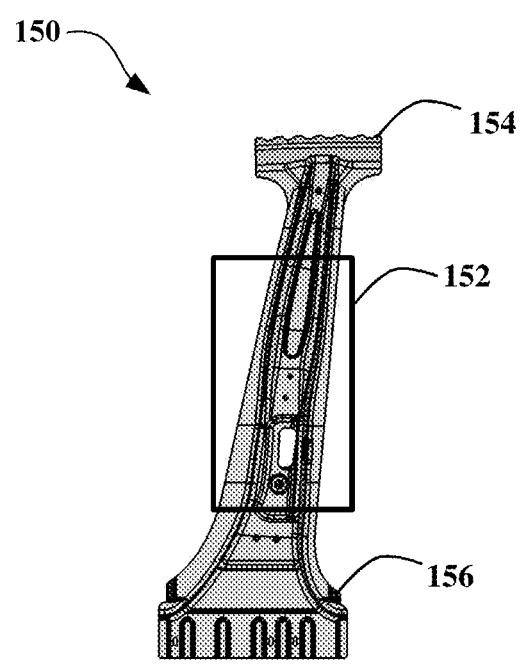
FIG. 6 shows a representative front view of a high-strength structural component in the form of a conventional B-pillar for an automobile treated in accordance with certain aspects of the present disclosure.

FIG. 6 shows a representative front view of a high-strength structural component in the form of a B-pillar 150 for an automobile. It should be noted that FIG. 6 is a representative simplified version of the B-pillar 150 and may have many additional parts joined together to form the B-pillar 150. The B-pillar 150 should have extreme strength in its middle section 152, but a balance of strength and ductility in its upper section 154 and lower section 156. The combination of these different properties promotes buckling at a desired location when a force or impact is applied to the B-pillar 150, which may correspond to seat level within the interior of the vehicle to protect the occupant(s) after the force or impact is applied. Thus, in accordance with certain aspects of the present disclosure, the middle section 152 has been quenched and selective cooled, while the upper section 154 and lower section 156 are unquenched and not treated. The selective cooling and quenching of the middle section 152 increases the strength and hardness of the region where impact or force may be received. The upper section 154 and lower section 156 of the B-pillar 150 still have retained austenite and therefore greater ability to absorb impact energy. In accordance with the present disclosure, high-strength structural automotive components can be made having select regions are cooled and tailor quenched where required. As discussed above, the high-strength structural automotive components may be selected from the group consisting of: rocker rails, structural pillars, A-pillars, B-pillars, C-pillars, D-pillars, bumper, hinge pillars, cross-members, body panels, vehicle doors, roofs, hoods, trunk lids, engine rails, and combinations thereof in certain variations.

In this manner, the present disclosure provides various ways of cooling selected areas on a hot-formed steel component that is made from a high-strength press hardening steel (PHS) that transforms retained austenite to martensite. This results in tailored properties across the hot stamped steel component, with some areas (e.g., those after being cooled to sub-zero temperature after hot forming) being stronger than others. This permits formation of tailor blanks having tailored properties, while reducing expense by avoiding use of other more complicated/expensive solutions to achieve tailored properties, like tailor rolled blanks and tailor blank assemblies that are welded. In certain aspects, a zinc-coated PHS component has tailored properties that reduces mass (compared to a PHS part with monolithic properties) at reduced cost (compared to other solutions for tailored properties, such as tailor-rolled/tailor-welded blanks).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of selectively quenching at least one region of a steel component, the method comprising:
selectively cooling at least one region of a hot-formed press-hardened component comprising a transformation induced plasticity (TRIP) steel selected from the group consisting of:
a Mn-TRIP steel comprising:
manganese (Mn) at greater than or equal to about 4% by weight of the total steel composition, and
carbon (C) at greater than or equal to about 0.1% by weight to less than or equal to about 0.4% by weight; and
a delta-TRIP steel comprising:
aluminum (Al) at greater than or equal to about 3% by weight to less than or equal to about 6% by weight of the total steel composition;
manganese at greater than or equal to about 0.1% by weight to less than or equal to about 1% by weight of the total steel composition; and
carbon at greater than or equal to about 0.3% by weight to less than or equal to about 0.5% by weight,
wherein the hot-formed press-hardened component has a microstructure comprising greater than or equal to about 5% by volume retained austenite in a matrix of martensite, wherein the selectively cooling quenches and cools the at least one region to a temperature of less than or equal to about −40° C. and forms at least one quenched region comprising less than or equal to about 1% by volume austenite.

2. The method of claim 1, wherein the selectively cooling comprises submerging the at least one region of the component in a cooling medium.

3. The method of claim 2, wherein the cooling medium is selected from the group consisting of: water, liquid nitrogen, solid carbon dioxide, and combinations thereof.

4. The method of claim 1, wherein the selectively cooling comprises spraying the at least one region with a cooling medium.

5. The method of claim 4, wherein the cooling medium is selected from the group consisting of: air, water, liquid nitrogen, solid carbon dioxide, and combinations thereof.

6. The method of claim 4, wherein the cooling medium has a temperature of less than or equal to about −60° C.

7. The method of claim 1, wherein the transformation induced plasticity (TRIP) steel is:
(i) a Mn-TRIP steel comprising:
manganese (Mn) at greater than or equal to about 4% by weight to less than or equal to about 12% by weight of the total steel composition, and
carbon (C) at greater than or equal to about 0.1% by weight to less than or equal to about 0.4% by weight of the total steel composition;
silicon (Si) at greater than or equal to about 0.1% by weight to less than or equal to about 0.5% by weight of the total steel composition;
chromium (Cr) at less than or equal to about 1% by weight of the total steel composition;
titanium (Ti) at less than or equal to about 0.2% by weight of the total steel composition;
aluminum (Al) at less than or equal to about 0.1% by weight of the total steel composition;
phosphorus (P) at less than or equal to about 0.2% by weight of the total steel composition;
sulfur (S) at less than or equal to about 0.05% by weight of the total steel composition;
one or more impurities cumulatively present at less than or equal to about 0.5% by weight of the total steel composition; and
a balance iron; or
(ii) a delta-TRIP steel comprising:
aluminum (Al) at greater than or equal to about 3% by weight to less than or equal to about 6% by weight of the total steel composition;
manganese at greater than or equal to about 0.1% by weight to less than or equal to about 1% by weight of the total steel composition;
carbon at greater than or equal to about 0.3% by weight to less than or equal to about 0.5% by weight of the total steel composition;
silicon (Si) at greater than or equal to about 0.1% by weight to less than or equal to about 0.5% by weight of the total steel composition;
chromium (Cr) at less than or equal to about 1% by weight of the total steel composition;
titanium (Ti) at less than or equal to about 0.2% by weight of the total steel composition;
phosphorus (P) at less than or equal to about 0.2% by weight of the total steel composition;
sulfur (S) at less than or equal to about 0.05% by weight of the total steel composition;
one or more impurities cumulatively present at less than or equal to about 0.5% by weight of the total steel composition; and
a balance iron.

8. The method of claim 1, prior to the selectively cooling further comprising: heating a blank to a temperature of less than or equal to about 782° C. for austenization; and press hardening the blank in at least one die to press and quench the blank to form the hot-formed press-hardened component.

9. The method of claim 1, wherein the at least one quenched region comprises less than 0.5% by volume austenite.

10. A method of selectively quenching at least one region of a steel component, the method comprising:
selectively cooling at least one region of a zinc-coated hot-formed press-hardened component comprising a transformation induced plasticity (TRIP) steel having a surface coating comprising zinc, the steel selected from the group consisting of:
(i) a Mn-TRIP steel comprising:
manganese (Mn) at greater than or equal to about 4% by weight of the total steel composition, and
carbon (C) at greater than or equal to about 0.1% by weight to less than or equal to about 0.4% by weight, and
(ii) a delta-TRIP steel comprising:
aluminum (Al) at greater than or equal to about 3% by weight to less than or equal to about 6% by weight of the total steel composition;
manganese at greater than or equal to about 0.1% by weight to less than or equal to about 1% by weight of the total steel composition; and
carbon at greater than or equal to about 0.3% by weight to less than or equal to about 0.5% by weight,
wherein the zinc-coated hot-formed press-hardened component has a microstructure comprising greater than or equal to about 5% by volume retained austenite in a matrix of martensite, wherein the selectively cooling quenches and cools the at least one region to a temperature of less than or equal to about −40° C. and forms at least one quenched region comprising less than or equal to about 1% by volume austenite.

11. The method of claim 10, wherein the selectively cooling comprises submerging the at least one region of the component in a cooling medium.

12. The method of claim 11, wherein the cooling medium is selected from the group consisting of: water, liquid nitrogen, solid carbon dioxide, and combinations thereof.

13. The method of claim 10, wherein the selectively cooling comprises spraying the at least one region with a cooling medium.

14. The method of claim 13, wherein the cooling medium is selected from the group consisting of: air, water, liquid nitrogen, solid carbon dioxide, and combinations thereof.

15. The method of claim 13, wherein the cooling medium has a temperature of less than or equal to about −60° C.

16. The method of claim 10, wherein the high strength transformation induced plasticity (TRIP) steel is:
  (i) a Mn-TRIP steel comprising:
    manganese (Mn) at greater than or equal to about 4% by weight to less than or equal to about 12% by weight of the total steel composition, and
    carbon (C) at greater than or equal to about 0.1% by weight to less than or equal to about 0.4% by weight of the total steel composition;
    silicon (Si) at greater than or equal to about 0.1% by weight to less than or equal to about 0.5% by weight of the total steel composition;
    chromium (Cr) at less than or equal to about 1% by weight of the total steel composition;
    titanium (Ti) at less than or equal to about 0.2% by weight of the total steel composition;
    aluminum (Al) at less than or equal to about 0.1% by weight of the total steel composition;
    phosphorus (P) at less than or equal to about 0.2% by weight of the total steel composition;
    sulfur (S) at less than or equal to about 0.05% by weight of the total steel composition;
    one or more impurities cumulatively present at less than or equal to about 0.5% by weight of the total steel composition; and
    a balance iron, or
  (ii) a delta-TRIP steel comprising:
    aluminum (Al) at greater than or equal to about 3% by weight to less than or equal to about 6% by weight of the total steel composition;
    manganese at greater than or equal to about 0.1% by weight to less than or equal to about 1% by weight of the total steel composition;
    carbon at greater than or equal to about 0.3% by weight to less than or equal to about 0.5% by weight of the total steel composition;
    silicon (Si) at greater than or equal to about 0.1% by weight to less than or equal to about 0.5% by weight of the total steel composition;
    chromium (Cr) at less than or equal to about 1% by weight of the total steel composition;
    titanium (Ti) at less than or equal to about 0.2% by weight of the total steel composition;
    phosphorus (P) at less than or equal to about 0.2% by weight of the total steel composition;
    sulfur (S) at less than or equal to about 0.05% by weight of the total steel composition;
    one or more impurities cumulatively present at less than or equal to about 0.5% by weight of the total steel composition; and
    a balance iron, wherein the component is substantially free of liquid metal embrittlement (LME).

17. The method of claim 10, prior to the selectively cooling further comprising: heating a blank comprising to a temperature of less than or equal to about 782° C. for austenization; and press hardening the blank in at least one die to press and quench the blank to form the hot-formed press-hardened component.

18. A method of selectively quenching a steel component, the method comprising:
  selectively cooling at least one region of a hot-formed press-hardened component comprising a steel selected from the group consisting of:
  a first steel composition comprising:
    manganese (Mn) at greater than or equal to about 4% by weight of the total steel composition, and
    carbon (C) at greater than or equal to about 0.1% by weight to less than or equal to about 0.4% by weight; and
  a second steel composition comprising:
    aluminum (Al) at greater than or equal to about 3% by weight to less than or equal to about 6% by weight of the total steel composition;
    manganese at greater than or equal to about 0.1% by weight to less than or equal to about 1% by weight of the total steel composition; and
    carbon at greater than or equal to about 0.3% by weight to less than or equal to about 0.5% by weight,
  wherein the hot-formed press-hardened component has a microstructure comprising greater than or equal to about 5% by volume retained austenite in a matrix of martensite, wherein the selectively cooling quenches and cools the at least one region to a temperature of less than or equal to about −40° C. and forms at least one quenched region comprising less than or equal to about 1% by volume austenite.

19. The method of claim 18, wherein the steel is:
  (i) the first steel composition comprising:
    manganese (Mn) at greater than or equal to about 4% by weight to less than or equal to about 12% by weight of the total steel composition, and
    carbon (C) at greater than or equal to about 0.1% by weight to less than or equal to about 0.4% by weight of the total steel composition;
    silicon (Si) at greater than or equal to about 0.1% by weight to less than or equal to about 0.5% by weight of the total steel composition;
    chromium (Cr) at less than or equal to about 1% by weight of the total steel composition;
    titanium (Ti) at less than or equal to about 0.2% by weight of the total steel composition;
    aluminum (Al) at less than or equal to about 0.1% by weight of the total steel composition;
    phosphorus (P) at less than or equal to about 0.2% by weight of the total steel composition;
    sulfur (S) at less than or equal to about 0.05% by weight of the total steel composition;
    one or more impurities cumulatively present at less than or equal to about 0.5% by weight of the total steel composition; and
    a balance iron; or (ii) the second steel composition comprising:
aluminum (Al) at greater than or equal to about 3% by weight to less than or equal to about 6% by weight of the total steel composition;
manganese at greater than or equal to about 0.1% by weight to less than or equal to about 1% by weight of the total steel composition;
carbon at greater than or equal to about 0.3% by weight to less than or equal to about 0.5% by weight of the total steel composition;
silicon (Si) at greater than or equal to about 0.1% by weight to less than or equal to about 0.5% by weight of the total steel composition;
chromium (Cr) at less than or equal to about 1% by weight of the total steel composition;
titanium (Ti) at less than or equal to about 0.2% by weight of the total steel composition;
phosphorus (P) at less than or equal to about 0.2% by weight of the total steel composition;
sulfur (S) at less than or equal to about 0.05% by weight of the total steel composition;
one or more impurities cumulatively present at less than or equal to about 0.5% by weight of the total steel composition; and
a balance iron.

\* \* \* \* \*